US008384582B2

(12) United States Patent
Chiassarini et al.

(10) Patent No.: US 8,384,582 B2
(45) Date of Patent: Feb. 26, 2013

(54) ACTIVE TRANSPONDER, PARTICULARLY FOR SYNTHETIC APERTURE RADAR, OR SAR, SYSTEMS

(75) Inventors: Giuseppe Chiassarini, Rome (IT); Giuseppe D'Angelo, Rome (IT)

(73) Assignee: Space Engineering S.p.A., Rome (IT)

( * ) Notice: Subject to any disclaimer, the term of this patent is extended or adjusted under 35 U.S.C. 154(b) by 0 days.

(21) Appl. No.: 12/444,489

(22) PCT Filed: Oct. 6, 2006

(86) PCT No.: PCT/IT2006/000710
§ 371 (c)(1),
(2), (4) Date: May 22, 2009

(87) PCT Pub. No.: WO2008/041252
PCT Pub. Date: Apr. 10, 2008

(65) Prior Publication Data
US 2010/0013700 A1    Jan. 21, 2010

(51) Int. Cl.
*G01S 13/90* (2006.01)
*G01S 13/76* (2006.01)
(52) U.S. Cl. ............ 342/25 F; 345/44; 345/51; 345/175
(58) Field of Classification Search ................ 342/25 F, 342/44
See application file for complete search history.

(56) References Cited

U.S. PATENT DOCUMENTS

| 4,319,358 | A | * | 3/1982 | Sepp ............................. 375/145 |
| 5,486,830 | A | | 1/1996 | Axline, Jr. et al. |
| 5,767,802 | A | * | 6/1998 | Kosowsky et al. ............. 342/45 |
| 5,821,895 | A | | 10/1998 | Hounam et al. |
| 6,577,266 | B1 | | 6/2003 | Axline |
| 6,791,489 | B1 | * | 9/2004 | Richardson et al. ............ 342/43 |
| 6,870,501 | B2 | * | 3/2005 | Beard ............................. 342/45 |
| 7,030,805 | B2 | * | 4/2006 | Ormesher et al. .............. 342/42 |
| 2002/0196178 | A1 | | 12/2002 | Beard |
| 2004/0178944 | A1 | | 9/2004 | Richardson et al. |

FOREIGN PATENT DOCUMENTS
DE          3248879 A1    4/1984

OTHER PUBLICATIONS

David Hounam et al.; "A Technique for the Identification and Localization of SAR Targets Using Encoding Transponders", IEEE Transactions on Geoscience and Remote Sensing, Jan. 1, 2001, vol. 39, IEEE Service Center, Piscataway, NJ, US.
Daleman P S et al.;"Experience With Active Radar Calibrators for Airborne Sar", May 20, 1990, 795-798.
Kodaira N; "Possibilty of the Use of A Transponder As an Active Sar Calibration Target", Jul. 10, 1989, vol. 1, pp. 258-260.

* cited by examiner

*Primary Examiner* — John B Sotomayor
*Assistant Examiner* — Matthew M Barker
(74) *Attorney, Agent, or Firm* — Arent Fox LLP

(57) ABSTRACT

An active transponder for synthetic aperture radar systems includes a receiving antenna for receiving a first radiofrequency signal modulated according to a first train of one or more first pulses, separating means comprising two outputs outputting the first radiofrequency signal, second processing means connected to a first output of the separating means to generate a code synchronized with the first pulses, signal generating means connected to the second output and to the second processing means generate a second radiofrequency signal modulated by the code, and a transmitting antenna means to transmit the second radiofrequency signal to generate, for each one of the first pulses, a sequence of one or more second pulses, the code being synchronized with the second pulses.

13 Claims, 1 Drawing Sheet

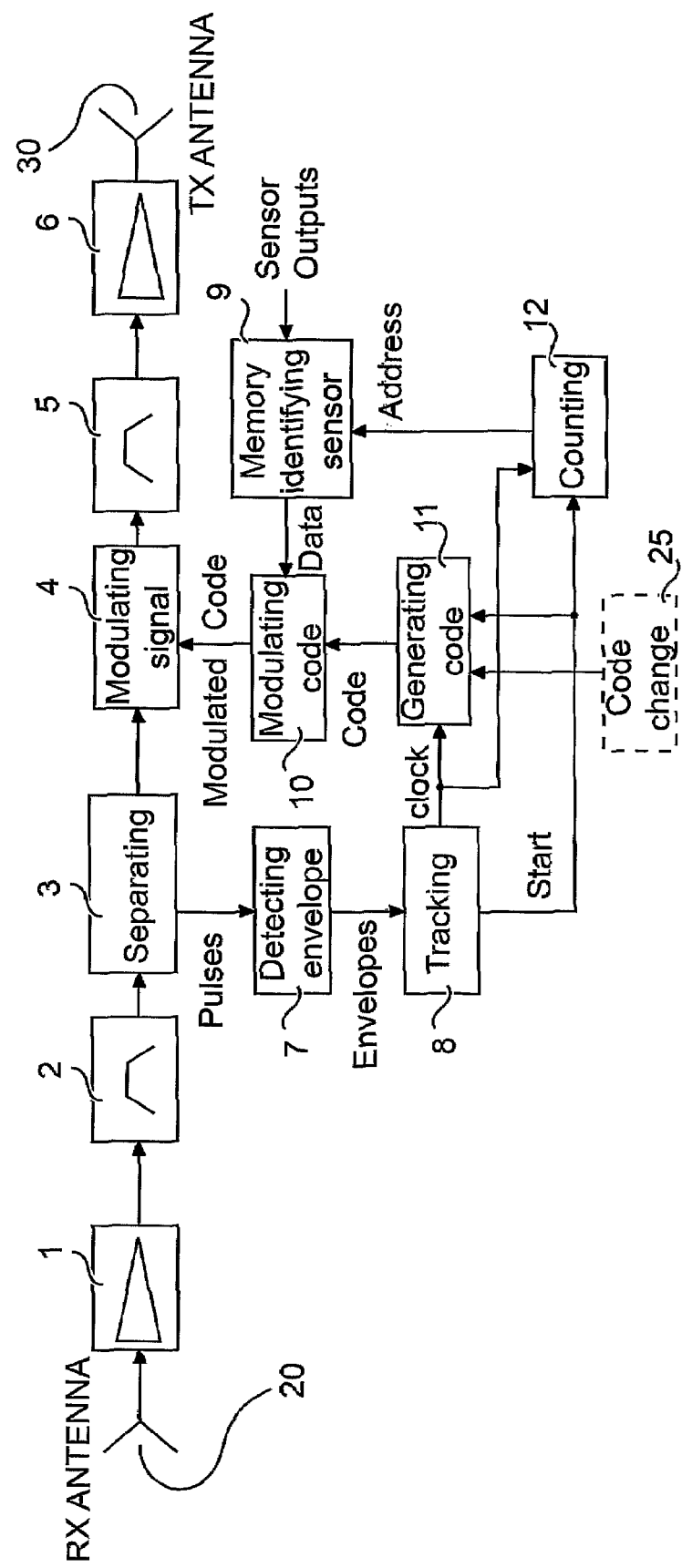

ACTIVE TRANSPONDER, PARTICULARLY FOR SYNTHETIC APERTURE RADAR, OR SAR, SYSTEMS

CROSS-REFERENCE TO RELATED APPLICATION

This application is a National Stage entry on International Application No, PCT/IT2006/000710 filed Oct. 10, 2006, which claims priority from Italian patent Application No. RM2005A000282 filed Jun. 3, 2005. The entire of this application is incorporated herein by reference.

FIELD OF THE INVENTION

The present invention relates to an active transponder, in particular usable in synthetic aperture radar systems, or SAR, that allows a SAR interrogator device, carried on an aircraft or satellite, to identify, in a reliable, simple and efficient way, objects associated with the transponder and to collect information thereon.

BACKGROUND OF THE INVENTION

It is known that the synthetic aperture radar, or SAR, is a microwave remote sensing active system that, installed onboard aircrafts or satellites, allows high resolution images of the observed scene to be generated independently from meteorological conditions and presence of sunlight. Generally, the wavelength of the microwaves used in a SAR system ranges from 3 to 30 cm.

Sensing resolution substantially depends on the band of the signal transmitted by the radar, the antenna beam angle and the distance between the radar system and the observed surface.

In applications requiring a continuous monitoring, as for instance in ground motion monitoring, the radar is preferably installed onboard a satellite. Notwithstanding the large distance at which such radar operates, equal to about 800 Km, SAR technology allows a high spatial resolution to be obtained, through an operation of processing the echo reflected by the surface irradiated by the transmitted signal. In particular, such processing makes a focusing of the image synthesising the reflected echo so as to simulate an antenna aperture significantly larger than that of the antenna actually installed onboard the aircraft.

One of the characteristics of the SAR systems is their capability to follow both the amplitude and the phase behaviour of the backscattered echo. In some applications, such as the Ground Motion Monitoring, the presence of Permanent Targets, or PTs, over the territory under observation allows possible ground variations to be detected through the analysis of the time sequences of the images obtained from the same scene. PTs have radio scattering properties known to the SAR system which remain stable in time.

Present PTs may be passive devices, such as reflectors known to the skilled in the art as "corner reflectors", or antenna active transponders. In the latter case, the signal re-transmitted by the transponder must have the same frequency of the received signal and a phase relationship with the received signal that is stable in time.

German Patent Application No. DE 32 48 879 A1 discloses a system adopting the technique of identification of the signals transmitted by the transponder with respect to the neighbouring ones, through transmission power and time location.

Such system suffers from some drawbacks. In fact, it subtracts scattering zones, and it does not allow the object to be distinguished from other close ones of the same kind.

U.S. Pat. No. 5,821,895 discloses a system adopting the technique of identification of the signals from the transponder through encoding of the single pulse. The SAR receiver device carries out correlations along azimuth and range directions of the received signal with the transmitted and expected SAR signal. These correlations do not detect the presence of the transponder for low correlation because of the presence of the code on the signal generated by the transponder. Differently, if correlations take account of the encoding on the transponder signal, then they detect a correlation peak in correspondence with the transponder position. In this way, the signal transmitted by the transponder is scarcely visible by the SAR receiver and it has not to be delayed to minimum scattering instant of poor interest. The system of U.S. Pat. No. 5,821,895 also adopts the technique of detection of the single SAR pulse for applying the code to the signal received by the SAR device.

Even this system suffers from some drawbacks.

First of all, the adopted technique is subject to detection errors due to the noise of the transponder receiver. Single pulse detection errors are terrible because when a pulse is lost, the applied code is misaligned and correlation is compromised or annulled.

Moreover, the system of U.S. Pat. No. 5,821,895 adopts the technique of intermediate frequency modulation, hence requiring the use of synthesisers and frequency converters which introduce harmonic and spurious components which may jeopardise the signal processing and increase the background noise.

SUMMARY OF THE INVENTION

It is therefore an object of the present invention to allow, in a radar system, in particular a SAR system, to identify, in a reliable, simple, and efficient way, even in a high reflection environment, objects associated with a transponder and to collect information thereon.

It is specific subject matter of the present invention an active transponder, particularly for synthetic aperture radar systems, or SAR, comprising:
  receiving antenna means, capable to receive a first radiofrequency signal modulated according to a first train of one or more first pulses;
  first processing means, connected to the receiving means, capable to amplify and filter the first radiofrequency signal;
  separating means, connected to the first processing means, comprising two outputs at each one of which it outputs the signal coming from the first processing means;
  second processing means, connected to a first output of the separating means, capable to generate at least one code synchronised with the first pulses;
  signal generating means, connected to a second output of the separating means and to the second processing means, capable to generate a second radiofrequency signal modulated by said at least one code generated by the second processing means;
  third processing means, connected to the signal generating means, capable to amplify and filter the second radiofrequency signal; and
  transmitting antenna means, capable to transmit the second radiofrequency signal;

characterised in that the second processing means is capable to generate, for each one of the first pulses, a sequence of one or more second pulses, said at least one code being synchronised with the second pulses.

Always according to the invention, the second processing means may comprise means for tracking the timing of the first pulses.

Still according to the invention, the second processing means may further comprise:
  envelope detecting means, connected to the first output of the separating means, capable to generate a sequence of one or more envelopes for each one of the first pulses;
the means for tracking the timing of the first pulses comprising:
  Delay Locked Loop tracking means, connected to the envelope detecting means, capable to generate a clock signal, synchronised with said envelopes, and a start signal, synchronised with the first train of one or more first pulses;
  code generating means, connected to the Delay Locked Loop tracking means, capable to generate a not modulated code that varies in synchronisation with said clock signal according to a variation rule synchronised with said start signal; and
  counting means capable to generate a count synchronised with said clock signal, set at a starting value by said start signal;
the second processing means further comprising:
  memory means, connected to the counting means, which outputs data stored at the memory address equal to said count; and
  first modulating means, connected to the code generating means and to the memory means, capable to generate said sequence of one or more second pulses through modulation of said not modulated code through the data outputted by the memory means.

Furthermore according to the invention, the envelope detecting means may be capable to generate an envelope for each one of the first pulses.

Always according to the invention, said variation rule may be changeable through code changing means.

Still according to the invention, the data stored at the memory address, corresponding to the starting value of said count, may comprise a transponder identifier.

Furthermore according to the invention, the data stored in the memory means may comprise data, preferably periodically updated, coming from one or more sensors associated with the transponder.

Always according to the invention, the Delay Locked Loop tracking means may be provided with fast acquisition means, capable to generate said start signal.

Still according to the invention, said fast acquisition means may comprise correlating means, capable to process one or more correlations between the first train of one or more first pulses and one or more second trains of one or more third reference pulses.

Furthermore according to the invention, the signal generating means may comprise modulating means, capable to modulate the signal coming from the separating means through said at least one code generated by the second processing means, thus obtaining the second radiofrequency signal.

Always according to the invention, the modulating means may be capable to phase and/or amplitude and/or frequency modulate the signal coming from the separating means.

Still according to the invention, the modulating means may be capable to shift the frequency of the signal coming from the separating means.

It is still specific subject matter of the present invention a method of receiving a first radiofrequency signal and of transmitting a second radiofrequency signal, particularly for synthetic aperture radar systems, or SAR, comprising the following steps:
A. receiving a first radiofrequency signal modulated according to a first train of one or more first pulses;
B. amplifying and filtering the first radiofrequency signal;
C. generating at least one code synchronised with the first pulses;
D. generating a second radiofrequency signal modulated by said at least one code;
E. amplifying and filtering the second radiofrequency signal; and
F. transmitting the second radiofrequency signal;
characterised in that step C comprises:
generating, for each one of the first pulses, a sequence of one or more second pulses, said at least one code being synchronised with the second pulses.

Always according to the invention, step C may comprise: tracking a timing of the first pulses.

Still according to the invention, step C may comprise:
C.1 generating a sequence of one or more envelopes for each one of the first pulses;
C.2 generating a clock signal, synchronised with said envelopes, and a start signal, synchronised with the first train of one or more first pulses;
C.3 generating a not modulated code that varies in synchronisation with said clock signal according to a variation rule synchronised with said start signal;
C.4 generating a count synchronised with said clock signal, set at a starting value by said start signal;
C.5 providing stored data corresponding to said count; and
C.6 generating said sequence of one or more second pulses through modulation of said not modulated code through the data provided in sub-step C.5.

Furthermore according to the invention, sub-step C.1 may generate an envelope for each one of the first pulses.

It is further specific subject matter of the present invention a SAR system, comprising a transmitting and receiving device and at least one active transponder, characterised in that the active transponder is a transponder as previously described.

BRIEF DESCRIPTION OF DRAWINGS

Various exemplary aspects of the systems and methods will be described in detail, with reference to the following FIGURES, wherein the FIGURE illustrates a schematic block diagram of the active transponder according to various aspects of the current invention.

DETAILED DESCRIPTION

The present invention will now be described, by way of illustration and not by way of limitation, according to its preferred embodiments, by particularly referring to the sole FIGURE of the enclosed drawings, showing a schematic block diagram of the active transponder according to the invention.

The inventors have developed a method and a device for locating, identifying, and collecting data on objects, using an active transponder in presence of a transmitting and receiving SAR device carried by an aircraft or a satellite. In particular, the active transponder receives the signal transmitted by the transmitting SAR device and provides for re-transmitting it back to the receiving SAR after phase encoding and addition of a transponder identification code and of local data related to the same transponder and to objects, preferably sensors, associated with the transponder. A processing device after the receiving SAR device, capable to decode signals received from transponders, is thus able to extract the identification code and local data.

In particular, the transponder according to the invention adopts an encoding of the SAR pulse different from that of the prior art systems, since it is based on a tracking of pulse timing, instead of the technique of detection of the single pulse. Timing tracking greatly reduces the probability of pulse loss and the consequent correlation loss.

Also, this allows to carry out not only the encoding of the single pulse, but the encoding inside the same pulse, in particular when the precision with which signal timing may be reconstructed is sufficiently high. Encoding inside the pulse allows noise immunity and transponder position measure accuracy to be improved.

Differently from the prior art, the transponder according to the invention may further use a preamble for the transponder identifying code, allowing the transponder to be identified in an area where several transponders are present and if the use of the sole code diversity is not sufficient for characterising the same.

Sensors associated with the transponder may transmit local detection data, for instance, environmental information coming from proper sensors.

Transmission of identifying code and data occurs through phase modulation in addition to that produced by the code. Each bit of the identifying code and the data occupies a number or a fraction of pulses adequate to ensure an acceptable value of the signal power/noise power ratio, and therefore an acceptable error rate.

In presence of low error rate conditions, transmission of the data and the identifier does not jeopardise the range and azimuth measure by the SAR receiver device, since identifier and data, once detected, may be used by the SAR receiver device for an intermediate processing. This processing removes the phase modulation of local data and identifier, known by that time, and it brings the final SAR processing back to the conventional case.

In particular, the transponder according to the invention adopts the technique of radio frequency modulation, eliminating the use of synthesisers and frequency converters, thus preventing harmonic and spurious components which may jeopardise the signal processing and increase the background noise from being introduced.

With reference to the FIGURE, it may be observed that the preferred embodiment of the transponder according to the invention comprises a receiving antenna 20 and a transmitting antenna 30, connected to each other through a cascade of stages shown in detail below. In particular, the receiving antenna 20 and the transmitting antenna 30 are adequately decoupled through an arrangement according to different directions and/or different polarisations.

The receiving antenna 20 is connected to the input of a low noise amplifier 1, which it provides with the wide band and low power received signal, that is amplified for keeping along the following stages a sufficient signal-to-noise ratio or SNR. The output of the low noise amplifier 1 is connected to the input of a band-pass filter 2, that outputs the filtered signal in which components in bands of no interest are excluded.

The output of filter 2 is connected to the input of a two-output separator 3, that provides a modulator 4 and an envelope detector 7 with the amplified and filtered signal, which, in presence of useful signal received from a SAR transmitter, comprises a modulated pulse train.

Envelope detector 7 outputs an envelope train corresponding to the pulse train received by the 3 to a Delay Locked Loop tracking stage 8. Preferably, detector 7 provides an envelope for each pulse received by separator 3.

Tracking stage 8 outputs a clock signal and a start signal to a code generator 11 and to a counter 12. The clock signal represents the time axis of the envelope train generated by envelope detector 7, in terms of a stabilised pulse sequence synchronised with the same envelope sequence. The start signal marks the time at which the process of reconstructing the time axis is deemed as reliable, i.e. the start instant of the SAR signal (that is, of the related pulse train) and the modulating process may be performed.

Code generator 11 outputs a code signal to a code modulator 10 in terms of a pulse train with phase varying at each pulse with variation synchronised with the pulse train generated by detector 7. The variation rule is internal to code generator 11 and it may be changed through an external code change control 25.

Counter 12 outputs the address of the datum to be transmitted to a memory 9, through modulation of the code generated by generator 11. Counter 12 operates on the basis of the clock signal, that causes it to advance, and of the start signal, that causes it to start.

Memory 9 provides code modulator 10 with the data in the sequence defined by the address sequence, as received by counter 12. The data are constituted of a transponder identifier (preferably contained within the first address of the sequence) and of a series of data preferably coming from sensors (not shown), such as for instance temperature, moisture, power supply, antenna aiming sensors (the data of which are advantageously periodically updated).

Code modulator 10 outputs a modulated code signal, obtained by modulating the code signal provided by generator 11 with the data of memory 9 retrieved according to the address sequence generated by counter 12, to signal modulator 4. In other words, the modulated code signal is obtained starting from the code signal provided by generator 11 through further phase variations, applied in the same application instants of the previous ones, produced by the data train also synchronised with the pulse train received by the receiving antenna 20.

Signal modulator 4 provides a filter 5 with the SAR signal, i.e. with the pulse train received by the receiving antenna 20, phase modulated with the phase sequence represented by the modulated code signal received by modulator 10.

Filter 5 provides an amplifier 6 with the SAR signal that is phase modulated and restricted to the band of interest, in order to avoid interferences on other bands and to exploit as much as possible the amplification chain.

Amplifier 6 provides the transmitting antenna 30 with the SAR signal that is phase modulated, filtered and amplified up to the desired level for its transmission towards the space.

The active transponder of the FIGURE further comprises a power supply stage, not shown.

Other embodiments of the transponder according to the invention provide that Delay Locked Loop tracking stage 8 is provided with a fast acquisition device, in order to minimise the time passing from the appearance of the first pulses and the activation of the start signal. The fast acquisition device may be constituted, for instance, of a correlator detecting the maximum correlation between the received pulse train and the expected pulse train. A plurality of correlators may be used in parallel with several timing in order to speed up the acquisition.

Furthermore, signal modulator 4 may apply modulations alternative or additional to the phase one, in order to increase the decorrelation of the transmitted signal with respect to natural reflectors and/or to transmit more information. By way of example, but not by way of limitation, modulator 4 may apply the amplitude modulation.

Moreover, signal modulator 4 may apply a proper frequency shift allowing the signal band to be reversed. In this way, for instance, in the case of chirp-like modulated pulse, the decorrelation between natural reflectors and the transponder signal increases in terms of larger ratio between useful signal and interfering signal and of lower interference on the detection of natural reflectors.

Alternatively, signal modulator 4 may be replaced with a signal generating stage capable to generate, for each SAR pulse received by the receiving antenna 20, a pulse of different length and/or different modulation and/or different energy, in order to increase the decorrelation of the transmitted signal with respect to natural reflectors and/or to transmit more information. By way of example and not by way of limitation, such stage could generate a frequency modulated signal.

The preferred embodiments have been above described and some modifications of this invention have been suggested, but it should be understood that those skilled in the art can make variations and changes, without so departing from the related scope of protection, as defined by the following claims.

The invention claimed is:

1. Active transponder comprising:
receiving antenna means, configured to receive a first radiofrequency signal modulated according to a first train of one or more first pulses;
first processing means, connected to the receiving means, configured to amplify and filter the first radiofrequency signal;
separating means, connected to the first processing means, comprising two outputs each one of which outputs the signal coming from the first processing means;
second processing means, connected to a first output of the separating means, configured to generate at least one code synchronised with the first pulses;
signal generating means, connected to a second output of the separating means and to the second processing means, configured to generate a second radiofrequency signal modulated by said at least one code generated by the second processing means and having at least one of a different frequency value from a frequency value of the first radiofrequency and a different phase value from a phase value of the first radiofrequency;
third processing means, connected to the signal generating means, configured to amplify and filter the second radiofrequency signal; and
transmitting antenna means, configured to transmit the second radiofrequency signal;
wherein the second processing means is configured to generate, for each one of the first pulses, a sequence of one or more second pulses, said at least one code being synchronised with the second pulses, the transponder being characterised in that the second processing means further comprises:
envelope detecting means, connected to the first output of the separating means, configured to generate a sequence of one or more envelopes for each one of the first pulses;
means for tracking the timing of the first pulses comprising:
Delay Locked Loop tracking means, connected to the envelope detecting means, configured to generate a clock signal, synchronised with said envelopes, and a start signal, synchronized with the first train of one or more first pulses;
code generating means, connected to the Delay Locked Loop tracking means, configured to generate a not modulated code that varies in synchronisation with said clock signal according to a variation rule synchronised with said start signal; and
counting means configured to generate a count synchronised with said clock signal, set at a starting value by said start signal;
the second processing means further comprising:
memory means, connected to the counting means, which outputs data stored at the memory address equal to said count; and
first modulating means, connected to the code generating means and to the memory means, configured to generate said sequence of one or more second pulses through modulation of said not modulated code through the data outputted by the memory means.

2. Transponder according to claim 1, characterised in that the envelope detecting means are configured to generate an envelope for each one of the first pulses.

3. Transponder according to claim 1, characterised in that said variation rule is changeable through code changing means.

4. Transponder according to claim 1, characterised in that the data stored at the memory address, corresponding to the starting value of said count, comprise a transponder identifier.

5. Transponder according to claim 1, characterised in that the data stored in the memory means comprise data, periodically updated, coming from one or more sensors associated with the transponder.

6. Transponder according to claim 1, characterised in that the Delay Locked Loop tracking means is provided with fast acquisition means, configured to generate said start signal.

7. Transponder according to claim 6, characterised in that said fast acquisition means comprises correlating means, configured to process one or more correlations between the first train of one or more first pulses and one or more second trains of one or more third reference pulses.

8. Transponder according to claim 1, characterised in that the signal generating means comprises modulating means, configured to modulate the signal coming from the separating means through said at least one code generated by the second processing means, thus obtaining the second radiofrequency signal.

9. Transponder according to claim 8, characterised in that the modulating means is configured to phase and/or amplitude and/or frequency modulate the signal coming from the separating means.

10. Transponder according to claim 8, characterised in that the modulating means is configured to shift the frequency of the signal coming from the separating means.

11. A synthetic aperture radar system, comprising a transmitting and receiving device and at least one active transponder, characterised in that the active transponder is a transponder according to claim 1.

12. Method of receiving a first radiofrequency signal and of transmitting a second radiofrequency signal, for synthetic aperture radar systems, or SAR, comprising the following steps:

A. receiving a first radiofrequency signal modulated according to a first train of one or more first pulses;
B. amplifying and filtering the first radiofrequency signal;
C. tracking a timing of the first pulses and generating at least one code synchronised with the first pulses;
D. generating a second radiofrequency signal modulated by said at least one code that has at least one of a different frequency value from a frequency value of the first radiofrequency and a different phase value from a phase value of the first radiofrequency;
E. amplifying and filtering the second radiofrequency signal; and
F. transmitting the second radiofrequency signal;
wherein step C comprises:
generating, for each one of the first pulses, a sequence of one or more second pulses, said at least one code being synchronised with the second pulses, the method being characterised in that step C comprises:

C.1 generating a sequence of one or more envelopes for each one of the first pulses;
C.2 generating a clock signal, synchronised with said envelopes, and a start signal, synchronised with the first train of one or more first pulses;
C.3 generating a not modulated code that varies in synchronisation with said clock signal according to a variation rule synchronised with said start signal;
C.4 generating a count synchronised with said clock signal, set at a starting value by said start signal;
C.5 providing stored data corresponding to said count; and
C.6 generating said sequence of one or more second pulses through modulation of said not modulated code through the data provided in sub-step C.5.

13. Method according to claim 12, characterised in that sub-step C.1 generates an envelope for each one of the first pulses.

* * * * *

UNITED STATES PATENT AND TRADEMARK OFFICE
CERTIFICATE OF CORRECTION

PATENT NO. : 8,384,582 B2  Page 1 of 1
APPLICATION NO. : 12/444489
DATED : February 26, 2013
INVENTOR(S) : Giuseppe Chiassarini et al.

It is certified that error appears in the above-identified patent and that said Letters Patent is hereby corrected as shown below:

Title Page, item (30) insert --June 6, 2005   (IT)...........RM2005A000282--

Signed and Sealed this
Twenty-third Day of April, 2013

Teresa Stanek Rea
*Acting Director of the United States Patent and Trademark Office*